United States Patent [19]

Lassaux et al.

[11] Patent Number: 4,829,566
[45] Date of Patent: May 9, 1989

[54] APPARATUS FOR DETECTING AND DISCRIMINATING PHASE JUMPS IN A PERIODIC SIGNAL AND ITS APPLICATION TO A TELEPHONE TONE SIGNAL WITH PHASE INVERSIONS

[75] Inventors: Jean Lassaux; Thierry Stephan, both of Lannion, France

[73] Assignee: Telecommunications Radioelectriques et Telephoniques T.R.T., Paris, France

[21] Appl. No.: 40,383

[22] Filed: Apr. 16, 1987

[30] Foreign Application Priority Data

Apr. 22, 1986 [FR] France ................................ 86 05784

[51] Int. Cl.⁴ ............................................ H04J 15/00
[52] U.S. Cl. .................................... 379/410; 370/32.1
[58] Field of Search ................ 379/98, 408, 410, 411; 375/83, 47, 96; 329/50, 107, 122, 126, 137, 138, 140; 370/32.1

[56] References Cited

U.S. PATENT DOCUMENTS

4,558,187 12/1985 Billi et al. ............................ 379/408

Primary Examiner—Eugene R. LaRoche
Assistant Examiner—David Mis
Attorney, Agent, or Firm—Thomas A. Briody; Jack E. Haken; Anne E. Barschall

[57] ABSTRACT

The apparatus for detecting and discriminating phase jumps in a periodic signal comprises, arranged in cascade between an input terminal (1) and an output terminal (2), a frequency converter (3) transforming the frequency spectrum of the input signal e(t) containing a line at the frequency $f_e$ in a continuous band spectrum whose frequency is centered around $f_e$, an interrupter (4), a resonator (5) having a resonant frequency $f_0$ near $f_e$ and a phasemeter (6) having detection and discrimination means. The ensemble of these elements (3-6) is controlled by a sequencer (7) which, at each period $\alpha$ such that $\alpha = t_1 + t_2$, allows the phase detection and the discrimination of each phase jump of a predetermined value $\Delta\phi_e$ which may be contained in the input signal at the frequency $f_e$.

18 Claims, 4 Drawing Sheets

APPARATUS FOR DETECTING AND DISCRIMINATING PHASE JUMPS IN A PERIODIC SIGNAL AND ITS APPLICATION TO A TELEPHONE TONE SIGNAL WITH PHASE INVERSIONS

BACKGROUND OF THE INVENTION

The invention relates to an apparatus for detecting and discriminating phase jumps of a predetermined value $\Delta\phi_e$ in a periodic electric signal of frequency $f_e$ contained in an electric input signal $e(t)$.

The general problem is that in a periodic electric signal phase jumps of predetermined values must be detected, these values frequently being sub-multiples of $\pi$. In the field of communications, phase modulation is one of the means for conveying information. In that case, the phase jumps are produced at a high rate and equipment such as modems are specially designed for transmitting, receiving or generating this type of signal.

The invention relates more specifically to recognizing periodic signals containing phase jumps, preferably a unique square-wave or sinusoidal signal, which is located in the voice frequency band and whose phase jumps, of a predetermined value comprised between 0° and 360°, are produced at regular intervals. Detecting these phase jumps enables the remote control of apparatus in, for example, electric or telephone networks.

In the field of telephone communication, the specific problem is the echo of electrical origin. The echo is generally the result of an impedance mismatch at the various 2-wire or 4-wire junctions of tandem links forming a telephone connection, or an imperfect decoupling between the 4-wire receive and send ports of 2-to-4-wire junctions, defining thereby the balancing attenuation, or these two phenomena combined. The trouble caused by an echo becomes more important as its level is higher and its delay is longer.

To obviate the electrical echo in circuits having a long propagation time, two types of equipment are the subject of CCITT Recommendations: the echo suppressors dealt with in Recommensation G.164, CCITT Yellow Book edition 1981, Volume III.1, page 154 ff. and the echo cancellers or compensators described in Recommensation G.165, CCITT Yellow Book edition 1981, Volume III.1, page 182 ff. The echo cancellers constitute an improvement with respect to echo suppressors because of the fact that they act less abruptly and that, for example, in case of a speech signal, they render it possible to reduce at the receiving end, the level of the echo signal whilst retaining the far-end speech information signal at its normal level.

Besides its regular use for speech signals whose terminals are subscriber sets, the telephone network is increasingly used for transmitting data signals, either in half-duplex or in full-duplex, and the terminals are then data modems. The specific character of the data signals, notably the existence of a level which is the same on transmission and on reception, renders the transmission of these signals incompatible with the presence of echo suppressors in the 4-wire telephone lines. For that reason, the Recommendation G.164 of the above-mentioned CCITT Yellow Book provides for a disabler in each echo suppressor. This disabler should be responsive to a disabling tone transmitted by the data transmission modem at the pure frequency, i.e. the frequency without phase jumps, of 2100 Hz±21 Hz.

When echo cancellers, alternatively designated echo compensators, appeared on the market, the CCITT reacted by recommending, in Recommendation G.165 of the above-mentioned Yellow Book, the same standard for disabling echo cancellers as the previously defined standard for echo suppressors, namely transmission of and making responsive to a disabling tone at the pure frequency of 2100 Hz±21 Hz.

It has been found that the presence of the echo canceller in the line significantly improved the data transmission in the half-duplex mode, but then the problem occurs that the echo suppressors must be disabled without disabling the echo cancellers, taking account of the fact that for full-duplex data transmission the same disabling signal must disable both the echo suppressors and the echo cancellers which may be present in the 4-wire part of the line. The solution to this problem, as recommended by Recommendation G.165 of the CCITT Red Book edition of 1984 which is actually still valid, is to have the echo canceller selectively recognize a disabling tone of a frequency of 2100 Hz±21 Hz containing periodic phase inversions produced every 450±25 ms, which cause the echo canceller to be disabled. In contrast the echo canceller must not respond to the presence on the line of a disabling tone of the pure frequency of 2100 Hz.

Thus, for speech signal transmission, in the absence of a 2100 Hz disabling tone, the echo suppressors and the echo cancellers are operative. For the data transmission in the half-duplex mode, the sending half-duplex data modem transmits a disablinag tone at the frequency of 2100 Hz, which disables the echo suppressors but in no way affects the operation of the echo canceller.

For the full-duplex transmission of data, the sending full-duplex data modem transmits a 2100 Hz disabling signal, with phase inversions, which disables both any echo suppressors and any echo cancellers present. In the latter case, each modem has its own echo attenuation equipment.

SUMMARY OF THE INVENTION

The invention has for its specific object to provide an arrangement, associated with each echo canceller, by means of which it is possible to recognize the above disabling signal of 2100 Hz with phase inversions. Several solutions are of course possible, including those proposed by AT&T Company in their delayed contribution LW, March 1984, relating to CCITT draft Recommensation G.165, Section 4. In that document three measures are proposed and evaluated:

a. A digital signal processing method using a 6-tap autocorrelator in conjunction with digital filters and a microprocessor for timing and control.

b. A conventional analog implementation which takes advantage of the fact that nearly instantaneous phase changes cannot propagate through a narrow filter without some delay.

c. An approach based on the use of a phase-locked loop incorporating a tone disabler designed to meer Recommensation G.164, but including additional circuitry which senses the phase disturbances as the 180° phase shifts propagate through the loop.

The above-indicated method (a) had produced the best results to date and these results are described in said proposition.

The apparatus of the present invention solves the described technical problem in a manner differing from the solutions indicated in the foregoing and, broadly speaking, permits the detection and discrimination of a phase jump or phase jumps in a periodic signal. The invention is able to do this. It comprises, arranged in cascade between an input terminal and an output terminal, a frequency converter transforming the frequency spectrum of the input signal into a continuous band spectrum of an amplitude proportional to the amplitude of said periodic signal and whose frequency band is centred on the frequency $f_e$, an interrupter, a resonator at a frequency $f_0$ comprised in said continuous band and a phasemeter constituted by detection means followed by discriminator means. In the inventions, the ensemble of these elements is controlled by a sequencer which enables, at regular intervals of a duration $\alpha$, the detection and discrimination of any possible phase jumps of a value $\Delta\phi_e$. Each sequence of duration $\alpha$ being split into two operational phases, each having a fixed duration: a first operational phase of a duration $t_1$ in which said interrupter is closed and said frequency converter and said resonator are operational, and a second operational phase of a duration $t_2$ in which said interrupter is open and said resonator operates autonomously during which second operational phase said phasemeter effects the detection and starts the discrimination of said phase jumps.

The basic idea of the invention is to bring a tone signal having a single frequency which can assume any value $f_e$ in a given frequency range, known at the input of the apparatus, to a fixed frequency of a predetermined value, $f_o$. This is realized whilst rigorously preserving in the signal thus processed the phase shift caused by any phase jump which might occur in the single-frequency input tone signal. It thus becomes possible to thereafter measure the phase of the signal and to subtract therefrom any variations on the sole basis of phase jumps in the input signal, that is to say without taking account of the frequency value of this input signal.

An apparatus according to the invention, designed to receive an input signal in the form of digital samples occurring at a sampling rate $f_s$, is characterized in that said sequencer includes a clock generator having the frequency $f_s$, that said frequency converter is a time-domain filter, that the function of opening said interrupter during the period of time $t_2$ is provided by temporally multiplying in a multiplier sample of the input signal by zero coefficients of said time-domain filter transferred to said multiplier at the rate $f_s$ after the sequence of non-zero coefficients characterizing said filter, that said resonator is a second-order, infinite-gain, purely recursive cell and is centered on the resonant frequency $f_0$, and that said phasemeter effects phase jump detection with the aid of said detection means to determining the instant $T_u$ and the direction of zero-crossing $SPAS_u$ of the output $s(t)$ of said resonator.

Detecting the phase can be done by any known means and more specifically by extrapolation, searching the zero-crossing instant of the signal as well as the direction in which the crossing is made, starting from two samples of the signal at the output of the resonator which are adjacent to each other and are such that one sample is positive and the other sample is negative.

However, a particularly advantageous embodiment of the invention which is only suitable for a digital processing of the signal, is characterized in that the frequencies $f_0$, $f_s$ and the time-duration $t_2$ are chosen such that $bf_s = b'f_0$, where the numbers b and b' are integers and where $t_2 f_s \geq b'$, and that said instant $T_u$ is represented at the output of said detection means by the chronological ordinal number of the sample which has the least absolute value during said second phase of duration $t_2$. Thus, the samples at the output of the resonator constitute a sequence of values which are available in the form of a periodical pattern of a period T'. By arranging for the time-duation $t_2$ to be limited to the value T', it is thus also ensured that, during the time-interval of duration $t_2 = T'$, the least significant sample can have been identified and its instant of appearance $T_u$ as well as the associated direction $SPAS_u$ in which the signal passes through zero can be stored in a memory.

An advantageous embodiment of the invention suitable for digital processing of the signal and compatible with the two preceding embodiments described in the foregoing, is characterized in that during each sequence said discriminator means effect a phase determination on the basis of an equation, denoted CALC, in terms of double differences, between the instants $T_u$ of different sequences and the associated values $SPAS_u$, suitable to cause zero values to appear at each sampling period in the absence of a phase jump and at least a non-zero phase value after the appearance of a phase jump. Said discriminator means moreover has means for eliminating the indeterminacy and for comparison to a threshold S (or thresholds S' and S'') which render it possible to validate said phase value when the latter is substantially equal to $\Delta\phi_e$.

Applying the apparatus of the invention to the detection of a 2100 Hz±21 Hz telephone tone signal with periodical phase inversions, is advantageously characterized in that the double difference equation mentioned above is:

$$CALC = T_u - 2T_{u-2} + T_{u-4}$$

that thereafter the following operations are successively effected by said discriminator means on the value CALC which is representative of the phase jump, the latter being assumed to be converted into degrees:

$$-SPAS_u \oplus SPAS_{u-4} = 1 \rightarrow \Delta\phi_3 \rightarrow \Delta\phi_3 + 180°;$$

else $$\Delta\phi_e \rightarrow \Delta\phi_e,$$

where the symbol $\oplus$ designates the addition modulo-2

$$-\Delta\phi_3 \rightarrow \Delta\phi_e \pmod{360°}$$

where $\Delta\phi_e$ (mode 360°) indicates the modulo-360° value of $\Delta\phi_e$ $$-\Delta\phi_e > 180° \rightarrow \Delta\phi_e \rightarrow 360° - \Delta\phi_e;$$

else $$\Delta\phi_e - \Delta\phi_e - \Delta\phi_e > S \rightarrow ISPHI_u = 1;$$

else $$ISPHI_u = 0,$$

where S is the discrimination threshold, less than 180°, and $ISPHI_u$ is the phase variation indicator for said instant $T_u$ and that the phase jump searched for is validated when:

ISPHI$_u$=1 confirms

ISPHI$_{u-2}$=1.

One important characteristic of the invention when the apparatus is designed for digital signal processing will be obvious: the above-characterized apparatus is very suitable for one-bit digital input samples, that is to say samples which are only encoded by their sign. In the latter case, which significantly simplifies the processing operation at the cost of only a slight reduction of its precision, the amplitude of the signal processed by the apparatus is normalized to a constant value, whatever the amplitude of the input signal to be processed.

Besides that it is possible to use the invention either for analog means or for digital means. By sampling and digital processing of the signal it is alternatively possible to utilize either a digital calculator, preferably a microprocessor suitable for digital calculation such as the Texas Instruments TMS 320 or microprogrammed logic circuits. These latter circuits are very suitable for high processing rates and more specifically enable the processinag of a standardized 32-channel pulse code modulated (PCM) signal.

BRIEF DESCRIPTION OF THE DRAWING

The following description which is given by way of non-limitative example with reference to the accompanying drawings, will make it better understood how the invention can be put into effect.

In the Figures, corresponding components are given the same reference numerals.

DETAILED DESCRIPTION OF THE PREFERRED EMBODIMENTS

The apparatus will now be described by way of example with reference to FIGS. 1 to 7. The apparatus is is designed to receive a telephone signal and to detect therein any intermittent phase inversions present in a tone signal contained in this telephone signal. The tone signal has a frequency $f_e$ between 2079 Hz and 2121 Hz. The difficulty detecting these inversions is predominantly the result of two constraints, namely the presence of noise in the input signal and the fact that the exact value of the frequency of the tone signal at the input of the apparatus is not known.

Figure 1:
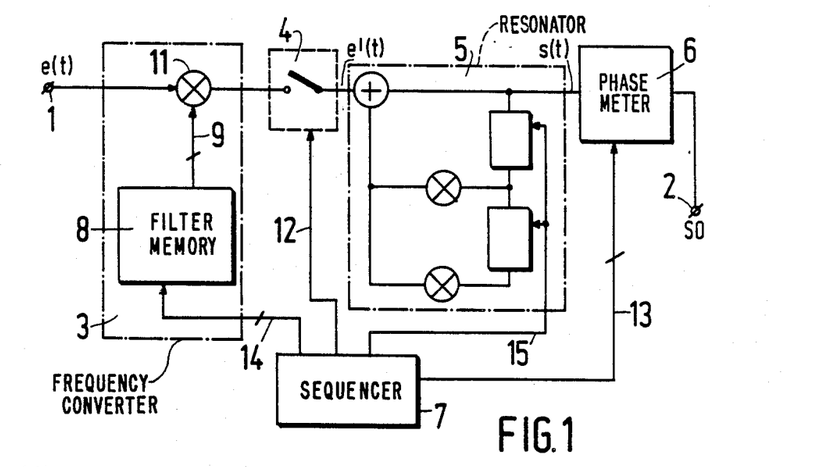
FIG. 1 is a general block diagram of the apparatus according to the invention.

The apparatus shown in FIG. 1 renders it possible to obviate these two constraints to the best possible extent. To that end the apparatus comprises, arranged in cascade between an input terminal 1 receiving the telephone input signal e(t) and an output terminal 2 on which a signal SO is present which is comparable to a logic signal, a frequency converter 3 shown in a dot-and-dash box, an interrupter 4 shown in a broken-line box, a resonator 5 shown in a dot-and-dash box and a phase-meter 6. A sequencer 7 controls the elements 3 to 6.

Figure 2A:
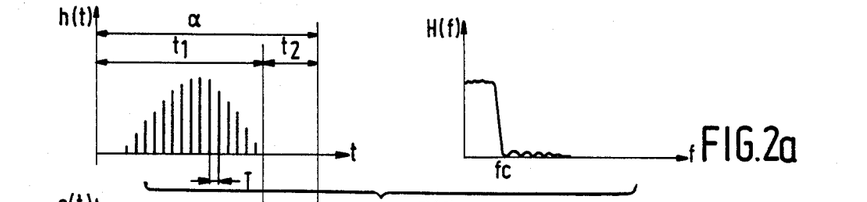
FIGS. 2a, 2b, 2c, 2d are time diagrams, with associated spectra, of the transfer function of the frequency converter and of the three signals processed by the apparatus according to the invention, respectively.
Figure 2B:
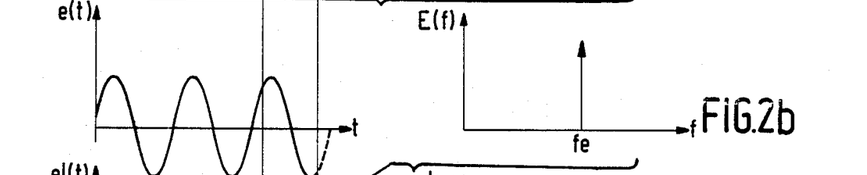

The input signal e(t), which is restricted to a single tone of frequency $f_e$, is shown in FIG. 2b together with its associated spectrum E(f). The other signals of interest to the circuit are the signal e'(t) with an associated spectrum E'(f), shown in FIG. 2c and applied by the frequency converter 3 to the resonator 5 when the interrupter 4 is closed, that is to say when the interrupter is in the position opposite to that shown in FIG. 1, and the signal s(t) with an associated spectrum S(f), shown in FIG. 2d and applied by the resonator 5 to the phase-meter 6. The transfer function H(f) shown in FIG. 2a is similar to the function of a low-pass filter whose cut-off frequency $f_c$ must be equal to at least half the frequency deviation possible for the frequency $f_e$, referenced $\Delta f_e$, that is to say:

$f_c \geq \Delta f_e / 2$

In the numerical example chosen in the foregoing, this frequency deviation $\Delta f_e$ is equal to 42 Hz.

The input e(t) may be an analog signal or may appear in the form of digital samples e(nT), T being the sampling period. The frequency converter 3 converts the signal e(t) into the signal e'(t). In the frequency-domain, the sole line at the frequency $f_e$ is converted into a pass-band spectrum comprised between $f_e - f_c$ and $f_e + f_c$. The amplitude of this band spectrum is substantially constant and equal to that of the input sine wave, provided this sine wave has not been submitted to limiting.

Preferably, the signal is processed digitally and then the frequency converter 3 comprises a filter memory 8 containing the sampled impulse response h(nT) of a low-pass filter. The coefficients of this filter have been calculated to obtain the transfer function H(f) of FIG. 2a and 15 of these coefficients are schematically represented by the graph h(t) in FIG. 2a. Two consecutive coefficients supplied by the multiple conductor 9 are separated by the sampling period T. Each sample coming from the input terminal 1 is multiplied in each period T.in a multiplier 11 by a corresponding coefficient of the filter memory 8. The filter memory 8 is operative for a period of time $t_1$, which is proportional to the number of coefficients of the filter, during which time the interrupter 4 is closed. This number of coefficients is higher the higher the requirements imposed on the transfer function of the low-pass filter as regards the cut-off slope and as regards the ripple error in the pass-band and in the stop-band.

Figure 2C:
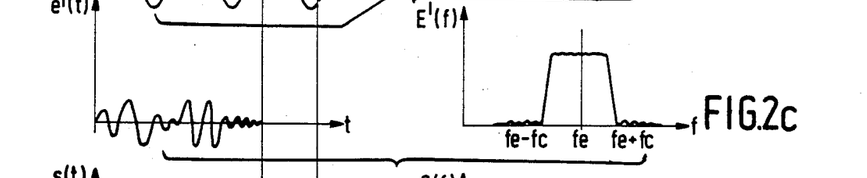
Figure 2D:
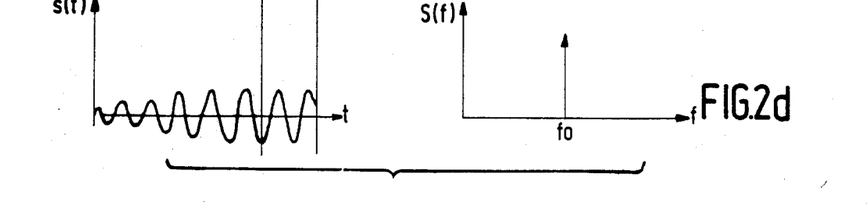

During the period of time $t_1$, the resonator 5 is excited and selects the line at the frequency $f_0$ in the pass-band E'(f), where $f_0$ is the resonant frequency of resonator 5. The optimum values to be chosen for $f_0$ and $f_c$ are:

$$f_0 = f_{e\ min} + \Delta f_e/2 = f_{e\ max} - \Delta f_e/2 \qquad (1)$$

$$f_c \geq f_{c\ min} = \Delta f_e/2 \qquad (2)$$

this choice being dictated by reasons of symmetry such that the value of $f_0$ is positioned half-way in the range of possible frequency deviations for $f_e$, it then being possible for the value of $f_c$ to be minimal as indicated by the equality sign in equation (2). It is however possible to choose a different value for $f_0$, for example to satisfy other criteria, provided this value remains in the range of frequency deviations of $f_e$. It is then necessary to take for $f_c$ a value higher than $\Delta f_e/2$ such that the starting criterion mentioned above remains satisfied, i.e. that the sole line of S(f), FIG. 2d, has a frequency belonging to the passband of E'(f), FIG. 2c.

The frequency converter 3 as described in the foregoing has the interesting property that it preserves the phase variations, that is to say that any phase jump appearing in the signal e(t), FIG. 2b, repeats itself accurately throughout the entire band of the signal e'(t), FIG. 2c. In these circumstances, whatever the frequency value of the tone signal at the input 1, any phase jump appearing in this signal repeats itself accurately in the output signal s(t) of the resonator 5. The time-duration $t_1$ is at least equal to the duration of the impulse response of the low-pass filter contained in the memory of the frequency converter 3. This time-duration, during which the interrupter 4 is closed, is followed by a time-duration $t_2$ during which this interrupter is open. The resonator 5 is then fed back and oscillates in itself, its input e'(t) having zero value. The resonator 5 and produces a signal s(t) which is a pure sinewave whose frequency remains constant and equal to $f_0$ and whose amplitude can only vary slightly. This variation moreover is without any significance for the invention. The time-duration $t_2$ is chosen such that the phase measurement can be effected by the phasemeter 6 for the operating cycle under consideration, whose duration $\alpha$ is equal to the sum of the durations $t_1$ and $t_2$.

In the digital version of the apparatus of FIG. 1, the interrupter 4 may physically be omitted, provided measures are taken to preserve its function, for example by transferring, during the time-interval $t_2$, the appropriate number (equal to $t_2/T$) of zero values to the multiple conductor 9 after the non-zero coefficients of the filter memory 8.

During the end of the time-interval $t_2$ and during the whole or part of the time-interval $t_1$ of the following cycle, the phasemeter 6 compares by any known means in analog or digital techniques the measured phase to phases measured during the preceding cycles and deduces therefrom whether phase jumps have occurred or not occurred during the just preceding cycle(s). When a phase jump is detected thus, it is compared to a (the) threshold(s), in the phasemeter 6, which renders it possible to discriminate between a phase jump of an expected predetermined value $\Delta\phi_e$ in the input signal and other parasitic phase jumps of different values which may appear in this signal. A detected phase jump of the value $\Delta\phi_e$ causes a monostable- or bistable-type change of state in the output state SO at the output terminal 2 of the apparatus.

In the digital version of the apparatus, the signal SO is a purely logic signal and changes, for example, from the 0 state in the absence of a phase jump equal to $\Delta\phi_e$, to the 1 stage when such a phase jump is present during a time-interval which may be equal to $\alpha$.

The above-described sequences of operations are obtained by means of the sequencer 7 which in the analog version of the apparatus controls at least the closing and opening of the interrupter 4 via a conductor 12 and the sequence of operations of the phasemeter 6 in the manner described above via a multiple conductor 13 (crossed by an oblique line).

In the digital version of the apparatus, the conductor 12 may be omitted. The filter memory 8 receives from the sequencer 7 via a multiple conductor 14 an appropriate addressing of its coefficients and the zero coefficients subsequent thereto. The resonator 5 is connected to the sequencer 7 via a conductor 15 for resetting its registers to zero. The phasemeter 6 is connected to the sequencer via the multiple conductor 13. It should be noted that in FIG. 1 the resonator is shown in a digital version in the form of a purely recursive second-order cell which is known per se and is described in greater detail hereinafter with reference to FIG. 3.

Figure 3:
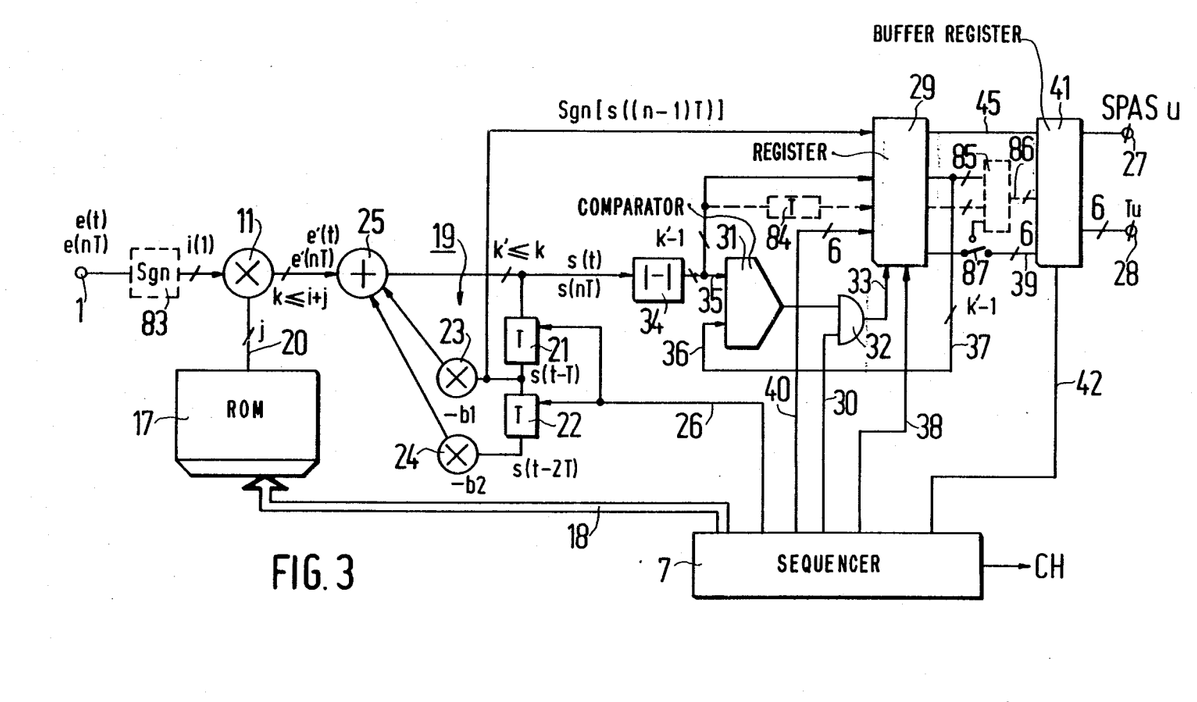
FIG. 3 is a detailed block diagram of that section of the apparatus detecting the phase jumps.

FIG. 3 shows the phase detection section of a preferred digital embodiment of the apparatus. It is assumed that the input signal e(t) applied to the terminal 1 is present in the form of i bits, for example, 8-bit PCM-encoded samples.

The basic principle of detecting a phase jump in the disabling tone signal is to use a time-domain filter which excites a perfect resonator centred on 2100 Hz, as described above in a general outline with referene to the FIGS. 1 and 2. The time-domain filtering operation consists in effecting at each sampling period T the multiplication of an input signal sample by a predetermined coefficient. Thus, the samples of the input signal are multiplied, in the special embodiment chosen here, by the impulse response of a low-pass transversal FIR filter with, for example 128 non-zero coefficients encoded in j bits. It should be noted that this time-domain multiplication corresponds, in accordance with the Fourier-Transform duality principle, a frequency-domain convolution.

The filter is physically realized, not counting the multiplier 11, in the form of a micro-programmed ROM memory 17, which has an addressing cycle of a duration $\alpha$ received from the sequencer 7 via an address bus 18. This high number of coefficients renders it possible to obtain a frequency response having a high degree of attenuation in the stop band and a very limited transition band, taking account of the 8 kHz sampling rate. In addition to the 127 non-zero coefficients encoded in j bits and conveyed during a time-interval $t_1$ at the beginning of the addressing cycle, via a multiple conductor 20 which is connected to a second input of the multiplier 11, the ROM memory 17 contains a predetermined number of zero coefficients conveyed during a time-interval $t_2$ at the end of the addressing cycle. To store the coefficients, it is possible to use in the ROM memory 17 a for example 12-bit linear code. It is alternatively possible to use a companded (non-linear) code, for example with three segment bits, three mantissa bits and a sign bit (like in a 7-bit PCM-code). The value of the coefficients can be obtained in a known manner, using a non-recursive filter synthesizing program loaded in a calculator so as to obtain the filter template H(f) defined in FIG. 2a.

The main advantage of this filter is that, while deforming (shifting) the spectrum of the input signal, it reproduces the phase variations of the input signal over all the spectral components of the output signal, as described already in the foregoing. In addition, in combination with the resonant cell 19 arranged subsequent thereto and behaving as a very selective band-pass filter centred on the frequency $f_0 = 2100$ Hz, this filtering action provides good protection from spurious noise. A sinewave s(t) of a frequency of 2100 Hz appears at the output of the resonant cell. Its level and its phase are a function of the level and the phase of the input signal e(t) as described hereinafter. This digital filtering operation is effected on the input signal with a periodicity a and during the time-interval $t_1$ which corresponds to the duration of the impulse response of the FIR filter, that is to say, when the operation is effected on a 32-channel PCM signal stream of 2048 kbits/s conveying a set of digital signal which permit a sampling rate $f_s$ of 8 kHz, or one sample every 125 μs, that:

$$t_1 = 127 \times 125 = 15875 \ \mu s$$

or approximately 16 ms.

The resonant cell 19 is preferably a purely recursive second-order cell, having an infinite gain and being centered on $f_0 = 2100$ Hz. This cell, which is described in a book by M. Bellanger entitled "Traitement numérique du Signal", published by Masson in 1981, pages 178 to 197, has a difference equation:

$$s(nT) = e'(nT) - b_1 s(n-1)T) - b_2 s((n-2)T) \quad (3)$$

The system function (Z-transform of the unit-sample response,) can be written:

$$H(Z) = \frac{Z^2}{Z^2 + b_1 Z + b_2} = \frac{1}{1 + Z^{-1} + b_2 Z^{-2}} \quad (4)$$

where $Z = e^{j2\pi fT}$.

This function has a double zero at the origin and two complex conjugate poles situated on the unit circle in the Z-phase plane (special case of the resonator), which for $b_1$ and $b_2$ entails the following values:

$$b_1 = -2\cos 2\pi \left(\frac{f_0}{f_s}\right) = -2\cos 2\pi \left(\frac{2100}{8000}\right) = -0.15692 \quad (5)$$

$$b_2 = 1 \quad (6)$$

The cell 19 is realized in a conventional manner, as shown in the FIGS. 1 and 3, by circuits which directly effect the operations represented in the expression of the system function (4). The terms $Z^{-1}$ and $Z^{-2}$ correspond to a delay T and a delay 2T and are realized by storage in the registers 21 and 22. The output numbers s(nT) are first delayed once, then twice, multiplied by the coefficients $-b_1$ and $-b_2$ in the multipliers 23 and 24 before being added in the adder 25 to the input numbers e'(nT). It should be noted that the registers 21 and 22 are reset to zero via a conductor 26 which is connected to the sequencer 7 at the beginning of each calculation window, that is to say at the beginning of each cycle of duration α. During the time-intervals $\alpha - t_1$, that is to say during the time-intervals $t_2$, the input e'(t) of the cell 19 has zero value and the cell freely oscillates in itself. The phase measurement of the signal s(t) is measured during this time-interval $t_2$ by the portion of the arrangement of FIG. 3 located to the right of the cell 19. The resonant cell is consequently periodically excited during a time-interval $t_1$ which is the duration of the input response of the inpulse filter (11, 17, 20). At the end of this time-interval $t_1$, the input e'(t) of the cell is zero, the amplitude of its output s(t) stabilizes and the time-interval $\alpha - t_1 = t_2$ is used to measure the phase for the cycle of duration α in question in order to make phase comparisons between consecutive cycles for detecting the phase variation from one cycle to the other. The signal resulting from the multiplication in each time interval [pα, pα+$t_1$] (p is an integer) is as follows:

Let h(t) be the impulse response of the input filter. A monofrequency signal of frequency $f_e$ present at the input of the circuit is considered; it holds that:

$$e'(t) = e(t) \cdot h(t) \quad (7)$$

$$e'(t) = \sin(2\pi f_e t + \phi_e) \cdot h(t)$$

where $$t \in [p\alpha, p\alpha + t_1]$$

The frequency response of a transversal filter is expressed by:

$$H(f) = R(f) e^{-j\phi(f)}$$

The Fourier transform of the signal after filtering is then:

$$\xi'(f) = F[e'(t)] = \int_{-\infty}^{+\infty} e'(t) e^{-2\pi j f t} dt$$

$$= \int_{p\alpha}^{p\alpha + t_1} e(t) \cdot h(t - p\alpha) e^{-2\pi j f t} dt$$

$$= \int_{p\alpha}^{p\alpha + t_1} e^{2\pi f_e j t + j \phi_e} \cdot h(t - p\alpha) e^{-2\pi j f t} dt$$

$$\xi'(f) = e^{-2\pi j (f - f_e) p\alpha + j\phi_e} \cdot \int_0^{t_1} h(t) \cdot e^{-2\pi j (f - f_e) t} dt$$

$$= e^{-2\pi j (f - f_e) p\alpha + j\phi_e} \cdot H(f - f_e)$$

The resonant cell is actually excited by the spectral component $f_0$, that is to say:

$$\xi'(f_0) E^{-2\pi j (f_0 - f_e) p\alpha + j\phi_e} \cdot H(f_0 - f_e) \quad (8)$$

The phase of the sinusoid s(t) at the output of the cell is consequently referred to this component. The phase $\phi_s(p)$ of the tone signal $f_0 = 2100$ Hz at the output is then:

$$\phi_s(p) = \phi_e(p) - 2\pi(f_0 - f_e) p\alpha + \theta(f_0) \quad (9)$$

where: $\phi_e(p)$: phase of the input signal.

Between two measuring intervals, $\theta(f_0)$ is invariant and the phase variation at the output between two consecutive filtering operations is then:

$$\Delta\phi = \phi_e(p) - \phi_e(p-1) - 2\pi(f_0 - f_e)\alpha \quad (10)$$

The quantity 2($f_0 - f_e$) is a constant $K_1$ which depends on the received frequency $f_e$ and must be eliminated when the measuring is taken into account. It then appears, that during a phase jump of the input signal, the 2100 Hz tone signal in the output signal will be affected by the same phase jump, that is to say:

$$\Delta\phi_s = \Delta\phi_e + K_1 \quad (11)$$

For consecutive values of $\Delta\phi_s$ the variation of $f_e$ is negligible, which justifies the fact of considering the quantity $2\pi(f_0 - f_e)\alpha$ as a constant $K_1$, at least for several values of $\Delta\phi_s$ which are near to each other.

The right-hand portion of the arrangement shown in FIG. 3 is used to measure the phase $\phi_s(p)$ defined in formula (9). Preferably, this measurement is effected by marking the lowest value assumed by the output signal during the time-interval $t_2$ and by retaining the identification time $T_u$ of this lowest-value sample which can be equated with a zero-crossing instant of the 2100 Hz sinusoid. To remove the uncertainty about 180° phase jump it is also necessary to know the zero-crossing direction at the instant $T_u$. At the output of the arrangement of FIG. 3 a logic signal $SPAS_u$ which is representative of the zero-crossing direction of the sinusoid and has, for example, value 0 for a positive slope and a value 1 for a negative slope, is obtained at a first output terminal 27, and at a second multiple output terminal 28 a signal $T_u$ which is, for example, taken into account by the ordinal number u of the minimum-amplitude sample to be counted from the beginning of the time-interval $t_2$.

To obtain the signals $SPAS_u$ and $T^u$ a register 29 is used which receives the signal s(t) and is controlled via a conductor 30 coming from a sequencer 7 by a clock signal of period T which is validated during the time-interval $t_2$ in which the zero crossing of s(t) is sought, and during the 1 states of the output of a comparator 31. This validation is provided by a logic AND-gate 32 whose two inputs are connected to the output of the comparator 31 and the sequencer 7, respectively. The output of the AND-gate 32 is connected to the register 29 via a conductor 33. The multiple input signals of the comparator 31 are on the one hand s(nT) available on a first multiple input 35 after having been rectified by a rectifier circuit 34, an s((n−1)T) obtained by feedback of a multiple output to a second multiple input 36 of the comparator via a conductor 37, the signal being delayed for the duration of one clock period in register 29. Moreover, the ordinal number of each sample is transmitted to the register 29, for example encoded with 6 bits, via a conductor 40 connected to the sequencer 7.

A further conductor 38 connecting the sequencer 7 to the register 29 serves to set the memory locations of said register to the value 1, that is to say to impose at register 29, at the beginning of $t_2$, the absolute maximum value of the stored sample. In the first time-interval $t_2$, this maximum value is conveyed to the comparator 31 via the conductor 37. When the signal at the input 36 has an amplitude less than the amplitude of the signal at input 35, the comparator 31 and consequently the AND-gate 32 supply a logic signal 0 at their outputs. For the opposite situation, the outputs of the elements 31 and 32 change to the logic 1 state, which controls the storage of the rectified signal s(nT) in register 29. The comparison between adjacent samples is thus effected in each sampling period, the amplitudes of the samples which are sequentially stored in register 29 becoming lower at each change of state. Concomitantly with the amplitude of any of these samples the ordinal number of the corresponding sample is stored via the conductor 40. At the end of the time-interval $t_2$ the register 29 contains the ordinal number u of the least significant sample of s(t) during $t_2$. At the end of the time-interval $t_2$, this ordinal number u is conveyed via the multiple conductor 39, for example encoded with 6 bits, to a buffer register 41 storing the zero-crossing instant $T_u$ that has been calculated. The register 41 is updated at each cycle period of duration $\alpha$ via a conductor 42 which is connected to the sequencer 7. The signal $SPAS_u$ itself is obtained directly from the signal s((n=1)T) which is applied to the register 29 and stored therein at the same time at which the amplitude of the corresponding sample and its ordinal number are stored.

As the sign bit having the value 1 for: $>0$ and 0 for: $<0$, the desired logic value for $SPAS_u$ is indeed obtained, that is to say that for two consecutive samples having an amplitude of decreasing absolute value, the same positive slope of the sinusoid corresponds to the two cases in which the first sample is negative and the subsequent sample is either negative or positive, which can be expressed by: $SPAS_u=0$. Similarly, using the same amplitude criterion, the same negative slope of the sinusoid correspond to the two cases in which the first sample is positive and the subsequent sample is either positive or negative, which can be expressed by: $SPAS_u=1$. The specific value of $SPAS_u$ which corresponds to the sample having the lowest amplitude during the time-interval $t_2$ is transferred from the register 29 to the buffer register 41 via a conductor 45, at the end of the cycle period $\alpha$. Measuring $T_u$ and choosing the duraction $t_2$ can be optimized with the two-fold object of enabling the selection of a short time-interval $t_2$ so as to increase the rate of the phase measurements, by reducing the cycle period $\alpha$, and of obtaining a number of samples having completely different amplitudes during the time-interval $t_2$ so as to have an appropriate accuracy in the measurement of the zero-crossing instant of the sinusoid, which accuracy is notably compatible with the accuracy related to the noise in the input signal, whereby it is made possible to reduce the distance between the thresholds for discriminating the desired phase jump, these thresholds being present in the signal processing operation downstream of the terminals 27 and 28.

Figure 4:
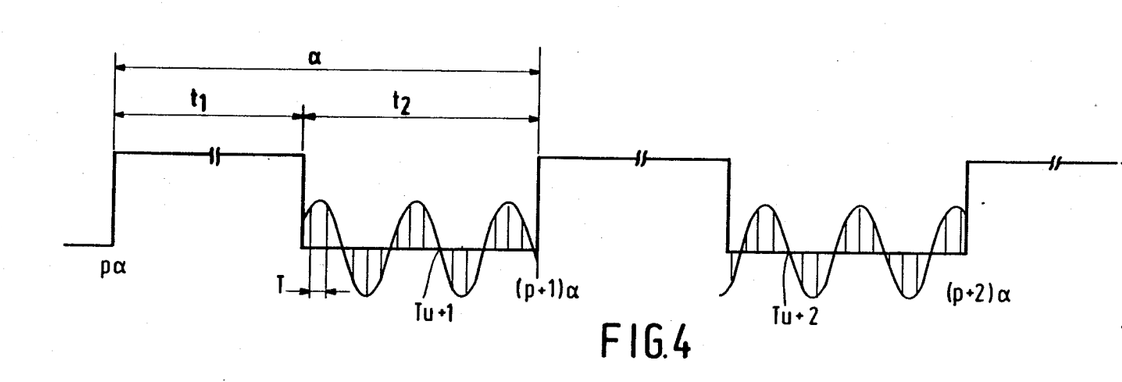
FIG. 4 represents the sequence of operations of the apparatus.

It is possible to obtain a number of samples having completely different amplitudes having a cyclical repetition at the end of a predetermined number of sinusoids by choosing the frequencies $f_0$ and $f_s$ such that they have certain mutual arithmetical properties. The criterion chosen is, for example, that after a number of consecutive samples, of the order of some dozens, a sequence of identical samples appears again. In this respect the frequencies: $f_0=2100$ Hz and $f_s=8000$ Hz are such that the sequence of samples which are representative of the sinusoid s(nT) repeat themselves in the same way in accordance with the same pattern of 80 samples of completely different amplitudes, two consecutive samples being spaced apart by an angle of 94.5° relative to the sinusoid s(nT). A sequence of 40 samples is sufficient for amplitudes of samples of which the absolute value is taken, which justifies the encoding with 6 bits of the ordinal number of the sample on the multiple conductors 40 and 39. Instead of 40 samples it is alternatively possible, whilst still maintaining the frequency $f_s=8$ kHz, to select a sequence up to 50 samples, whilst maintaining the frequency $f_0$ in the range allocated to it as described in the foregoing, with reference to FIG. 2, all this with the object of improving the accuracy of the zero-crossing measurement of the sinusoid. Preferably, however, for reasons of symmetry, the central value: $f_0=2100$ Hz is preserved, which, for the value of $T_u$, results in a corresponding accuracy of the phase equal to ±2.25°. Forming repetitive sequences of samples is illustrated in FIG. 4 where the ratio: $f_s f_0 = 20/3$ is chosen by way of example, that is to say an angular spacing of 54° between samples, from which a repetitive sequence of 20 samples is derived, that is to say 10 samples as regards the absolute value in association with the additional information about the direction in which the sinusoid crosses through zero. The time-interval $t_2$ can be limited to the duration of these 10 samples, or these 40 to 50 samples, respectively in the preceding digital example.

Generally, it is advantageous to choose the frequencies $f_0$, $f_s$ and the time-interval $t_2$ such that:

$$bf_s = b'f_0$$

where the numbers b and b' are integers and where:

$$t_2 f_s \geq b'.$$

In FIG. 4, the time-interval $t_2$ is chosen unnecessarily long, having a duration of the order of 17 samples. During the time-interval of the cycle $(p+1)\alpha$, $T_u$ (references $T_{u+1}$) is represented by a sample ordinal number of 10, that is to say a phase of:

$$10 \times 54 = 540°.$$

During the time interval of the cycle $(p+2)\alpha$, $T_u$ (referenced $T_{u+2}$) is represented by a sample ordinal number 5, that is to say a phase of:

$$5 \times 54 = 270°.$$

It should be noted that to simplify the notations, the variations of the index p have been carried forward to the index u, the index u therefore does no longer represent in the sequel of this description, the ordinal number of the sample during the time-interval $t_2$.

The phase difference $\Delta\phi_1 = 540 - 270 = 270°$ expresses a calculated phase evolution which may reveal a phase jump of the input signal in the time-interval $t_2$ of the cycle $(p+1)\alpha$ or in the time-interval $t_1$ of the cycle $(p+2)\alpha$. If this phase jump is produced during a time-interval $t_2$ during which the resonant cell 19 is not excited, the phase measurement of the subsequent cycle is correct. However, if this phase jump is produced during a time-interval $t_1$, the excitation of the cell is disturbed and the subsequent phase measurement is faulty. Now, as a function of the above-defined constraints, the time-interval $t_1$ is generally longer than the time-interval $t_2$, which makes it more probable for the phase jump to appear during $t_1$ than during $t_2$. This may seem an intrinsic disadvantage of the invention but for the fact that it can be easily remedied, as will be described hereinbelow with reference to the FIGS. 5 to 7. It is actually sufficient to wait for the next measurement to obtain, on the basis of differences and in a correct manner, the value of the phase jump.

In order to get simultaneously rid of the phase component $K_1 = 2\pi(f_0 - f_e)\alpha$ due to the frequency value $f_e$, which generally differs from $f_0$, of the received tone signal, and of the possible incorrect measurement connected with the instant of phase jump, the following expression is preferably chosen to measure the development of the phase of the signal:

$$\begin{aligned} CALC &= T_u - T_{u-2} - (T_{u-2} - T_{u-4}) \\ CALC &= T_u - 2T_{u-2} + T_{u-4} \end{aligned} \quad (12)$$

it being assumed that one single phase jump can be produced during the period of time $4\alpha$.

The constant phase shift to be considered, which however is cancelled by virtue of the relation (12) then is:

$$K_2 = 2\pi(f_0 - f_e)\cdot 2\alpha = 2K_1.$$

Let it be assumed that the values chosen for $\alpha$, $t_1$ and $t_2$ are $\alpha = 24$ ms, $t_1 = 16$ ms, $t_2 = 8$ ms, respectively.

The choice of the relation (12) is justified as follows: determining the phase variations is based on the search for the zero-crossings of the signal at the frequency $f_0 = 2100$ Hz or at least on the search for the lowest value of the signal in a measuring period $t_2 = 8$ ms and the storage of the corresponding instant $T_u$ relative to the beginning of the measuring operation. The phase shift between two consecutive measurements of the order $p-1$ and p is:

$$\Delta\phi_1 = 2\pi f_0(T_u - T_{u-1}) + K \quad (13)$$

which is a different way of expressiong the phase variation $\Delta\phi$, one expression of which is already given by the above formula (10). When the direction of zero-crossing is not the same for the cycles $(p-1)$ and p, $\Delta\phi$ has then to be increased by 180°.

As indicated in the foregoing, if the subsequent measurement (or cycle p) is awaited to effect the phase comparison to get rid of a possible disturbance of the resonator by a phase jump, the phase variation to be considered in a period $2\alpha$ is expressed at the cycles of rank $p+1$ and $p-1$ by:

$$\Delta\phi_2(p) = 2\pi f_0(T_{u+1} - T_{u-1}) + C \quad (14)$$

where the index 2 added to $\Delta\phi$ indicates that the phase variation is measured every $2\alpha$, and where C is a constant depending on the received frequency $f_e$.

To get rid of the constant C, the difference between two values of $\Delta\phi$ separated by $2\alpha$ is taken at each period, which reveals in the correctly measured phase variation $\Delta\phi_e$:

$$\Delta\phi_e(p) = \Delta\phi_2(p+1) - \Delta\phi_2(p-1) \quad (15)$$

For reasons of symmetry, two sequences later there follows:

$$\Delta\phi_e(p+2) = \Delta\phi_2(p+3) - \Delta\phi_2(p+1) \quad (16)$$

which allows confirmation of the measurement $\Delta\phi_e(p)$. At the end of each time window $\alpha = 24$ ms, it is then necessary to calculate:

$$\begin{aligned} \Delta\phi_e(p) &= \Delta\phi_2(p+1) - \Delta\phi_2(p-1) \\ \Delta\phi_e(p) &= \phi_s(p+1) - 2\phi_s(p-1) + \phi_s(p-3) \end{aligned} \quad (17)$$

The quantity which is representative of $\Delta\phi_3(p)$ is the quantity given by the above relation (12).

On the basis of the value of CALC it is possible to deduce whether a phase variation in conformity with the specifications has been obtained or not obtained, for example a phase inversion for the case described in CCITT Recommensation G.165.

Figure 5:
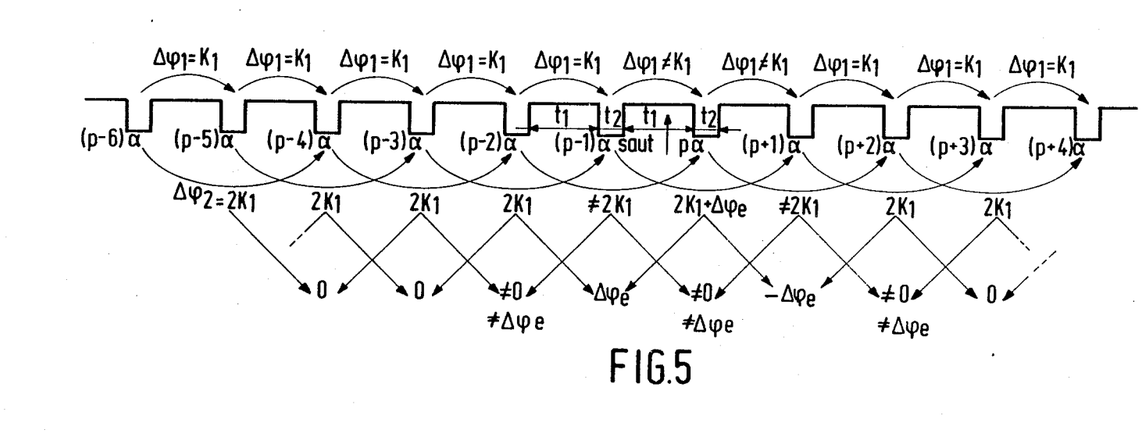
FIG. 5 serves to illustrate an operational mode for the discrimination of phase jumps in the input signal.

FIG. 5 illustrates what has been described in the foregoing in connection with the expressions (12) to (17) for the case in which a phase jump is produced during the time-interval $t_1$ of the cycle $p\alpha$. If there is no phase jump, the value of $\Delta\phi_1$ is equal to a constant $K_1$.

The correct values for $\Delta\phi_e$ are obtained, but for their signs, in the cycles of rank $p+1$ and $p+3$, with a spacing of $2\alpha$. In a manner not shown, when the phase jump is produced during the time-interval $t_2$ of the cycle $(p-1)\alpha$, the correct values for $\Delta\phi_e$ are obtained, but for their signs, in the cycles of rank p, $p+1$, $p+2$ and $p+3$; in this latter case there is a double confirmation.

Figure 6:
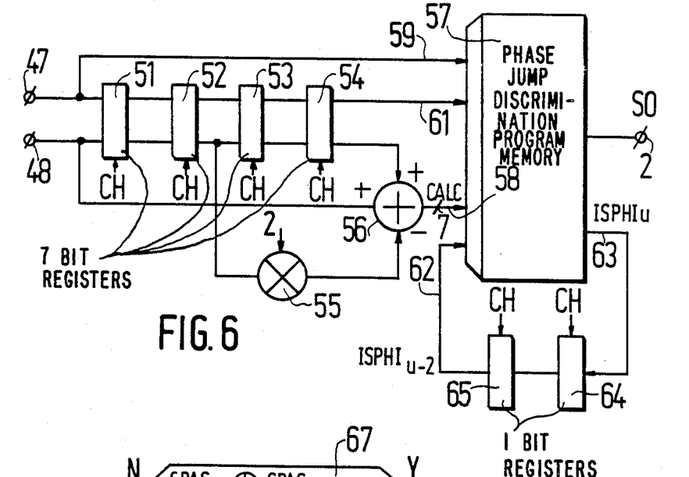
FIG. 6 is a detailed block diagram of a preferred embodiment of that section of the apparatus which, in continuation of the section shown in FIG. 3, effects the phase jump discrimination.
Figure 7:
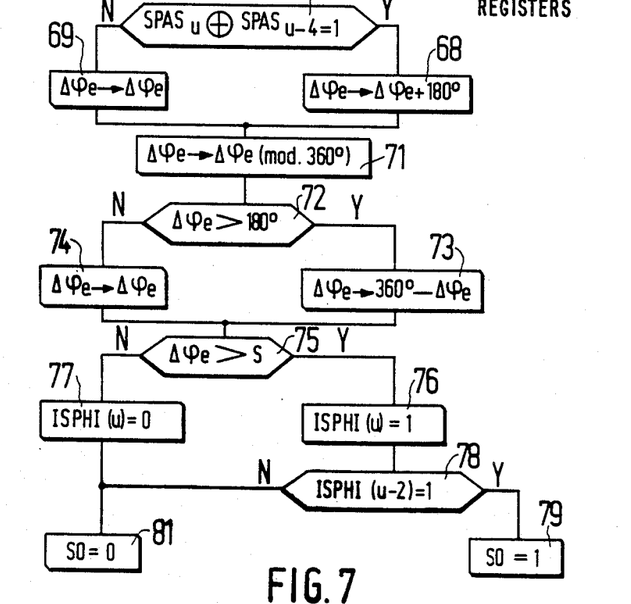
FIG. 7 is a flow diagram serving to illustrate the mode of operation of the apparatus of FIG. 6.

FIG. 6 shows a circuit, whose input terminals 47 and 48 are connected to the respective terminals 27 and 28 of FIG. 3, for discriminating the phase jump $\Delta\phi_e$ as described in the foregoing. This circuit comprises four series-arranged 7-bit registers 51 to 54, which are loaded at each period $\alpha=24$ ms by a signal CH originating from the sequencer 7, FIG. 3. The expression CALC of the relation (12) is obtained, starting from these registers, by means of a multiply-by-two multiplier 55 and an adder-subtracter 56, for example as shown in FIG. 6. A phase jump discrimination program memory 57 receives, in addition to the signal CALC it receives at a multiple input 58, the signal $SPAS_u$ at an input 59, the signals $SPAS_{u-4}$ delayed by $4\alpha$ in the registers 51–54 at an input 61 and a signal $ISPHI_{u-2}$ at an input 62. The memory 57, which is of the programmable read-only type operates in the micro-programmed logic mode; it is programmed such that the inputs 58, 59 and 61 form an addressing of its memory locations which contain either a 0 or a 1 and that a logic signal ISPHI, which is indicative of the phase variation, obtained in accordance with the flow diagram of FIG. 7 is applied to an output 63. The value ISPHI=1 appearing during a time-interval equal to $\alpha$ at the output 63 represents the appearance of a phase jump of a predetermined value $\Delta\phi_e$ at the input 1 of the apparatus. The value ISPHI=0 indicates, however, the absence of a phase jump which would be very near $\Delta\phi_e$. The output 63 is connected to the output 62 via two 1-bit registers 64 and 65, for example constituted by D-type flip-flops, loaded at each period $\alpha=24$ ms. Within the PROM memory 57, not shown, a logic AND-function is effected, at each sequence $\alpha$, between $ISPHI_u$ and $ISPHI_{u-2}$, which forms the confirmation (at the rank u) of a detection of a phase jump $\Delta\phi_e$ occurring $2\alpha$ earlier at the rank $u-2$. The result of this AND function is transferred to the output 2 of the apparatus and constitutes the output signal SO which has a value 1 when a phase jump $\Delta\phi_e$ is produced at the input and a value 0 in the opposite case.

Programming the memory 57 is preferably realized by first programming a minicomputer or a minicalculator, the program used being established on the basis of a flow diagram as described hereinafter with reference to FIG. 7, so as to define a relation between each binary number present at the inputs 58, 59 and 61, and the contents, 1 or 0, defined by the programming operation, entered in the memory location addressed by this number.

In FIG. 7, in block 67, the indeterminacy connected with the direction in which the signal s(t) crosses through zero at the ranks u and $u-4$ is checked first, the zero crossing direction of the rank $u-2$ not occurring at the rank $u-2$ because of the presence of the coefficient 2 in the relation (12). The test consists in an exclusive-OR logic function (addition modulo-2) $SPAS_u \oplus SPAS_{u-4}=1$. (Y) indicates opposite zero-crossing directions and then, in block 68, 180° is added to the phase value measured, which may be expressed by: $\Delta\phi_e \rightarrow \Delta\phi_e + 180°$. In the opposite case (N), $SPAS_u + SPAS_{u-4}=0$ and the phase value measured remains unaltered, that is to say, in block 69: $\Delta\phi_e \rightarrow \Delta\phi_e$. The subsequent operation consists in limiting the phase value to 360° by searching its value comprised between 0° and 360°, that is its value modulo 360°, which is expressed by: $\Delta\phi_e \rightarrow \Delta\phi_e$ (mod 360°), in block 71. In the specific case of a 180° phase jump, a restriction to a value of $\Delta\phi_3$ less than 180° is sufficient and thereafter only one comparison threshold (decision threshold) S needs to be used. The latter test is effected in block 72. For $\Delta\phi_e 180°$, block 73 performs the operation:

$$\Delta\phi_e \rightarrow 360° = \Delta\phi_e$$

is effected. In the opposite case, the phase value is preserved in block 74: $\Delta\phi_e \rightarrow \Delta\phi_e$. Comparing the value to threshold S is effected in the subsequent block 75, it being a must for $\Delta\phi_e$ to be comprised between S and 180° for it to be taken into account as a phase inversion detected in the input signal e(t). For $\Delta\phi_e > S$ it follows, in block 75: ISPHI(u)=1; else, in block 77, ISPHI (u)=0. The end of the diagram, that is to say the test block 78: ISPHI(u-2)=1 and the blocks 79: SO=1 and 81: SO=0, has already been described in detail in the foregoing and does not form part of the write program of the PROM 57. The output 2 on which the signal SO is present is to be connected to a disabling input stage of an echo canceller constituted by an AND-gate which at its other input receives the binary signal generated by a conventional disabling tone detector in accordance with the CCITT Recommendation G.164. In the numerical application for telephony, the choice of the thresholds S is a function of two main factors, namely the discrimination relative to the parasitic phase jumps in the resynchronisation associated with the loss or a doubling of an information bit (frame jumps in PCM), it being possible for these jumps to reach 110°, and the above-mentioned CCITT recommended standard which, for a phase inversion, is: 180°±25°. Preferably, the threshold S is chosen halfway the range from 110° to 155°, that is to say at 132°. The discrimination of $\Delta\phi_e=180°$ is then correct, provided the noise does not cause a phase variation greater than $155-132=23°$, which is true down to a signal-to-noise ratio as small as 0 dB. In the absence of noise, the phase variation does not exceed 10°, which would bring the threshold to 145°.

It should be noted that the exact expression of the phase expressed, for example, in degrees by the number CALC at the multiple input 58 is:

$$\Delta\phi_e = \frac{f_0}{f_s} \times 360 \times \text{CALC} \frac{f_0 \times 360}{f_s} \qquad (18)$$

being a constant which in the numerical example chosen above has a value of 94.5°, i.e. the angular spacing between two samples of the sinusoid s(t).

In the embodiment of the invention described in the foregoing, whose structure is shown in FIGS. 3 and 6, it is possible to limit the sampling operation of the input signal to one single bit, that is to say to the sign bit, which is shown by the broken-line block 83 (Sgn) in FIG. 3. With this simplified embodiment, which normalizes the amplitude of the input signal, the multiplier 11 is limited to a simple sign inverter of given coefficients of the PROM memory 17. In the arrangement of FIG. 3 it is alternatively possible to use other known techniques and methods for determining the instant $T_u$ at which the signal s(t) crosses through zero. The instant $T_u$, for example, is obtained by interpolation during the first zero-crossing of as soon as two samples of inverted signs have been detected; to that a register 84, shown by means of broken lines, is inserted between the output of the rectifier 34 and a further multiple (k'−1)-bit input of the register 29. The elements 31 and 32 are then superfluous. When the pair of samples in question has been detected, it is transferred to an interpolator 85 which effects a linear interpolation between the amplitudes of the two inverted-sign samples. The fraction of the sampling period thus calculated is added to the time $T_u$ and applied via a multiple output 86 to the buffer register 41. Applying $T_u$ to the interpolator 85 is symbolized, in FIG. 3, by a changeover switch 87 which must be set to the position opposite to the position shown in the Figure. This technique renders it possible to limit the time-interval $t_2$ to a half-cycle of the signal s(t), that is to say $\frac{1}{2} f_0$; this duration is also more accurate than the technique described in the foregoing.

The embodiments shown in the FIGS. 3 and 6 are suitable for a 32-channel PCM signal because of their high processing rates. However, to process one telephone channel or a small number of telephone channels, it is within the reach of a person skilled in the art to realize the signal processing operation according to the invention by programming a digital calculator, whether use is made of one or more microprocessors or of one or more mini-computers, thanks to the above detailed descriptions.

The apparatus of FIG. 1 can also be realized in analog form. The filter 8 is, for example, an analog low-pass filter, active or passive, excited by a Dirac-pulse which is repeated at each period of duration α. The multiplier 11 is a known analog multiplier described in the user's manuals of analog electronic components, more specifically in the manuals "Linear Applications" published by the United States firm National Semiconductor. The resonator 5, in its analog version, must allow of a very high Q factor, over 500. To realize this circuit it is, for examle, possible to use the resonator described in U.S. Pat. No. 2,905,812 which utilizes an electromechanical resonator oscillating at 20 kHz. The interrupter 4 itself can be realized by means of an analog multiplexer which is a normal commercially available component.

In a manner not shown, detecting the zero-crossing of the signal s(t) may alternatively easily be effected using a voltage comparator having one of its inputs connected to 0 volt. Determining the zero-crossing instant is, for example, realized by means of a voltage ramp which stabilizes at the transition instant of the binary output signal of the comparator. Measures can be taken to ensure that an analog-to-digital converter produces an encoded value of the ramp voltage obtained which corresponds to the zero-crossing instant $T_u$, this instant being, for example, produced by a digital counter which is controlled by the comparator output signal.

It should moteover be noted that the invention is not limited to discriminating phase inversions which are spaced from each other by 450 ms in a tone signal, but that it also permits the discrimination of phase jumps of any predetermined value, comprised between 0° and 360°, on the expense of a comparison with two thresholds S' and S'', and in the mono-frequency or multi-frequency electric signals other than telephone signals, associated, for example, with railway signalling or interconnected electric networks.

What is claimed is:

1. An apparatus for detecting and discriminating phase jumps of a predetermined value $\Delta\phi_e$ in a periodic electric signal of frequency $f_e$ contained in an electric input signal e(t) comprising:
   I. a cascade arrangement including:
      a. an input terminal,
      b. a frequency converter for transforming a frequency spectrum of the input signal e(t) into a continuous band spectrum having:
         i. an amplitude proportion to an amplitude of said periodic signal, and
         ii. a frequency band centered on said frequency $f_e$,
      c. an interrupter,
      d. a resonator resonating at a frequency $f_0$ comprised in the continuous band of said continuous band spectrum,
      e. a phasemeter, including:
         i. detection means,
         ii. discriminator means following the detection means, and
      f. an output terminal;
   II. a sequencer for controlling the elements of the cascade arrangement, the sequencer operating in regular intervals of duration α, to enable the detection and the discrimination of any possible phase jumps of the value $\Delta\phi_e$, each interval of duration α being split into two operational phases, each having a fixed duration, a first operational phase of a duration $t_1$ in which said interrupter is closed and said frequency converter and said resonator are operational, and a second operational phase of a duration $t_2$ in which said interruptor is open, said resonator operates autonomously, and said phasemeter effects the detection and starts the discrimination of said phase jumps.

2. An apparatus, as claimed in claim 1, wherein:
   a. said input signal is in the form of digital samples occurring at a sampling rate $f_s$,
   b. said sequencer includes a clock generator supplying a clock signal having a frequency equal to the rate $f_s$,
   c. said frequency converter is a time-domain filter, having a sequence of non-zero coefficients which characterize the time-domain filter and zero coefficients following the sequence of non-zero coefficients,
   d. said resonator is a second-order, infinite gain purely recursive cell centered on the frequency $f_0$, and
   e. said phasemeter detects the phase jumps with the aid of said detection means for determining an instant $T_u$ and a direction of zero-crossing $SPAS_u$ of an output signal s(t) of said resonator;
   the apparatus further comprising:
   f. a multiplier for opening said interrupter during the second operational phase by temporally multiplying the samples of the input signal by the zero coefficients of said time-domain filter, which zero coefficients are transferred to said multiplier at the rate $f_s$ after the sequence of non-zero coefficients.

3. An apparatus as claimed in claim 2, characterized in that the frequencies $f_0$, $f_s$ and the time duration $t_2$ are chosen such that $bf_s = b'f_0$, where the numbers b and b' are integers and where $t_2 f_s \geq b'$, and that said instant $T_u$ is represented at the output of said detection means by the chronological ordinal number of the sample which has the least absolute value during said second phase of duration $t_2$.

4. An apparatus as claimed in claim 3 wherein
the input signal e(t) is a telephone tone signal supplied by a data transmission modem;
the phase jumps are phase inversions intended to disable operation of at least one echo canceller; and
the output terminal supplies a signal in response to the detection and discrimation of the phase jumps in order to disable the operation of the at least one echo canceller.

5. An apparatus as claimed in claim 4 wherein:
a. the input signal e(t) is a 32-channel PCM telephone signal,
b. the apparatus is realized by means of micro-programmed logic circuits,
   i. said frequency converter being a PROM memory, and
   ii. said phasemeter comprising a plurality of PROM memories one of which is used for the discrimination of phase jumps.

6. An apparatus as claimed in claim 3 wherein:
a. the input signal e(t) is a 32-channel PCM telephone signal,
b. the apparatus is realized by means of micro-programmed logic circuits,
   i. said frequency converter being a PROM memory, and
   ii. said phasemeter comprising a plurality of PROM memories one of which is used for the discrimination of phase jumps.

7. An apparatus as claimed in claim 2 or 3, characterized in that, during each duration $\alpha$, said discriminator means effect a phase determination on the basis of a double equation, denoted CALC, in terms of double differences between instant $T_u$ of different sequences and associated values $SPAS_u$, suitable to cause zero values to appear at each sampling period in the absence of a phase jump and at least a non-zero phase value after the appearance of a phase jump, said discriminator means moreover including means for eliminating the indeterminacy and for comparison to a threshold S (or thresholds S' and S") which renders it possible to validate said phase value when the latter is substantially equal to $\Delta\phi_e$.

8. An apparatus as claimed in claim 7 wherein
the input signal e(t) is a telephone tone signal supplied by a data transmission modem;
the phase jumps are phase inversions intended to disable operation of at least one echo canceller; and
the output terminal supplies a signal in response to the detection and discrmination of the phase jumps in order to disable the operation of the at least one echo canceller.

9. An apparatus as claimed in claim 8 wherein:
a. the input signal e(t) is a 32-channel PCM telephone signal,
b. the apparatus is realized by means of micro-programmed logic circuits,
   i. said frequency converter being a PROM memory, and
   ii. said phasemeter comprising a plurality of PROM memories one of which is used for the discrimination of phase jumps.

10. An apparatus as claimed in claim 7 wherein:
a. the input signal e(t) is a 32-channel PCM telephone signal,
b. the apparatus is realized by means of micro-programmed logic circuits,
   i. said frequency converter being a PROM memory, and
   ii. said phasemeter comprising a plurality of PROM memories one of which is used for the discrimination of phase jumps.

11. An apparatus as claimed in claim 4, wherein:
a. the input signal e(t) is a telephone tone signal of frequency $f_e = 2100$ Hz supplied by a data transmission modem,
b. the phase jumps are phase inversions intended to disable at least one echo canceller,
c. said double equation is:

$$CALC = T_u - 2T_{u-2} + T_{u-4},$$

d. after calculation of the value CALC, said discriminating means performs the following operations successively on the value CALC which is representative of the phase jump, the phase jump being assumed to be expressed in degrees:

$$-SPAS_u \oplus SPAS_{u-4} = 1 \rightarrow \Delta\phi_e \rightarrow \Delta\phi_e + 180°;$$

else $$\Delta\phi_3 \rightarrow \Delta\phi_3,$$

where the symbol $\oplus$ designates addition modulo-2

$$-\Delta\phi_e \rightarrow \Delta\phi_e \ (\text{mod } 360°),$$

where $\Delta\phi_e$ (mod 360°) indicates the modulo-360° value of $\Delta\phi_e$ $$-\Delta\phi_e > 180° \rightarrow \Delta\phi_e \rightarrow 360° \Delta\phi_e;$$

else $$\Delta\phi_e \rightarrow \Delta\phi_e - \Delta\phi_e > S \rightarrow ISPHI_u = 1,$$

else $$ISPHI_u = 0,$$

where S is a decriminator threshold, less than 180°, and $ISPHI_u$ is a phase variation indicator for said instant $T_u$, and e. the phase jumps are detected when:

$$ISPHI_u = 1$$

confirms $$ISPHI_{u-2} = 1.$$

12. An apparatus as claimed in claim 11 wherein:
a. the input signal e(t) is a 32-channel PCM telephone signal,
b. the apparatus is realized by means of micro-programmed logic circuits,
   i. said frequency converter being a PROM memory, and
   ii. said phasemeter comprising a plurality of PROM memories one of which is used for the discrimination of phase jumps.

13. An apparatus as claimed in claim 2 wherein:
a. the input signal e(t) is a 32-channel PCM telephone signal, b. the apparatus is realized by means of micro-programmed logic circuits,
  i. said frequency converter being a PROM memory, and
  ii. said phasemeter comprising a plurality of PROM memories one of which is used for the discrimination of phase jumps.

14. An apparatus as claimed in claim in claim 2 in which the input signal e(t) is in the form of samples which are encoded by their sign bit.

15. An apparatus as claimed in claim 6 wherein
the input signal e(t) is a telephone tone signal supplied by a data transmission modem;
the phase jumps are phase inversions intended to disable operation of at least one echo canceller; and
the output terminal supplies a signal in response to the detection and discrimination of the phase jumps in order to disable the operation of the at least one echo canceller.

16. An apparatus as claimed in claim 15 wherein:
a. the input signal e(t) is a 32-channel PCM telephone signal,
b. the apparatus is realized by means of micro-programmed logic circuits,
  i. said frequency converter being a PROM memory, and
  ii. said phasemeter comprising a plurality of PROM memories one of which is used for the discrimination of phase jumps.

17. The apparatus of claim 2, wherein all of the elements are part of a single digital computing means.

18. An apparatus as claimed in claim 17 wherein:
a. the input signal e(t) is a 32-channel PCM telephone signal,
b. the apparatus is realized by means of micro-programmed logic circuits,
  i. said frequency converter being a PROM memory, and
  ii. said phasemeter comprising a plurality of PROM memories one of which is used for the discrimination of phase jumps.

* * * * *